United States Patent [19]

Massy et al.

[11] 4,262,033

[45] Apr. 14, 1981

[54] PROCESS FOR ADVANCING HIGHLY METHYLATED METHYLOLGUANAMINES WITH TRIAZINES UREAS OR BISCARBAMATES

[75] Inventors: Derek J. R. Massy, Linton; Kenneth Winterbottom, Whittlesford, both of England

[73] Assignee: Ciba-Geigy Corporation, Ardsley, N.Y.

[21] Appl. No.: 81,948

[22] Filed: Oct. 4, 1979

[30] Foreign Application Priority Data

Oct. 4, 1978 [GB] United Kingdom ............... 39300/78

[51] Int. Cl.$^3$ ........................ B05D 1/06; B05D 3/02; C08G 12/30
[52] U.S. Cl. ..................................... 427/27; 427/195; 427/388.3; 427/389.7; 427/391; 427/393; 428/436; 428/460; 428/528; 525/162; 525/443; 525/510; 528/258
[58] Field of Search ................... 528/258, 254, 29.4 R; 427/195, 388.3, 27

[56] References Cited

U.S. PATENT DOCUMENTS

| | | | |
|---|---|---|---|
| 3,082,190 | 3/1963 | Boldizar | 260/67.6 |
| 3,454,529 | 7/1969 | Casebolt | 260/67.6 |
| 3,501,429 | 3/1970 | Bonzagni | 260/17.3 |
| 3,515,697 | 6/1970 | Milva et al. | 260/67.6 |
| 3,922,447 | 11/1975 | Isaksen et al. | 428/474 |
| 4,101,520 | 7/1978 | Boldizar | 260/29.4 R |

FOREIGN PATENT DOCUMENTS

| | | |
|---|---|---|
| 466096 | 5/1937 | United Kingdom . |
| 1026696 | 4/1966 | United Kingdom . |
| 1048710 | 11/1966 | United Kingdom . |
| 1171669 | 11/1969 | United Kingdom . |
| 1314564 | 4/1973 | United Kingdom . |

OTHER PUBLICATIONS

Chem. Abst., vol. 76, 1972; p. 474, (59661p)
Chem. Abst., vol. 82, 1975, p. 89, (74607t).

*Primary Examiner*—Theodore E. Pertilla
*Attorney, Agent, or Firm*—Luther A. R. Hall

[57] ABSTRACT

Highly methylated methylolguanamines, such as a methylated tetramethylolbenzoguanamine or tetramethylolacetoguanamine, are advanced by heating under acid to neutral conditions with an advancement agent such as benzoguanamine, acetoguanamine, ethyleneurea, 1,3-propyleneurea, melamine, or urea. The products may be heated with resins containing at least two alcoholic hydroxyl, carboxylic acid, or carboxylic amide groups per molecule to form hard, crosslinked coatings. They are particularly useful in powder coatings.

10 Claims, No Drawings

PROCESS FOR ADVANCING HIGHLY METHYLATED METHYLOLGUANAMINES WITH TRIAZINES UREAS OR BISCARBAMATES

BACKGROUND OF THE INVENTION

This invention relates to a novel process for preparing aminoplast resins, more particularly, advanced etherified methylolguanamine resins, to the resins made by the new process, and to their use in coating compositions.

Etherified methylolguanamine resins are, in general, well known, commercially available materials and are used in numerous fields of application, especially in liquid or powder coating compositions. They are prepared by reacting a guanamine with formaldehyde or a formaldehyde donor such as paraform under neutral or basic conditions to form the methylolated guanamine and etherifying this with an alkanol under acid conditions (see, for example, British Pat. No. 1,026,696). Such materials are often blended with an alcoholic hydroxyl group-containing resin, such as an alkyd, polyester, acrylic resin, or polyepoxide, and cured at elevated temperatures in the presence of an acid catalyst, or, when larger proportions of an acid catalyst are used, at room temperature. Carboxyl-containing resins have also been used as the coreactant.

For certain applications, such as in the formulation of powder coatings, it is preferred that the etherified methylolguanamine resin is a non-sticky solid at room temperature or at slightly elevated temperatures. Many commercially available etherified methylolguanamine resins are sticky, high viscosity liquids at ordinary temperatures, and so cannot be used in powder coatings.

Further, it is known that while, when butanol is used as the etherifying alcohol, the resultant resin is fully compatible with a wide range of co-reactants and solvents, such compatibility is not always achieved when a lower alcohol is used. However, complete elimination of butanol from the resin is not easy to achieve, and its presence, either remaining after etherification or liberated by the curing process, makes the resin unpleasant to handle without very effective ventilation.

We have now found a novel method of making etherified methylolguanamine resins which are solid at ambient and slightly elevated temperatures, which are fully compatible with a wide range of co-reactants and solvents, and which do not contain butanol or liberate it on curing.

It is known, from British Pat. No. 948,853, to prepare a modified aminoplast resinous composition by i. forming a partially polymerised aminotriazine resin comprising an aldehyde, especially formaldehyde, and an aminotriazine, which is usually melamine but may be a guanamine, ii. adding a small amount of an aminotriazine to the partially polymerised aminoplast resin (which is unetherified), iii. heat-treating the resulting syrup for a short period, and iv. cooling the hot syrup, and then blending therewith a small amount of one or more amines.

The product is used alone to form laminates from glasscloth.

British Pat. No. 1,048,710 describes the reaction of benzoguanamine and formaldehyde to form a monomeric reaction product which is then treated with melamine and a polymerisation catalyst is added. The product is likewise unetherified.

In the process now provided, a monomeric, highly methylated, methylolated guanamine is heated with an advancement agent, which may be an aminotriazine, urea, a cyclic urea, or a biscarbamate, under neutral or slightly acid conditions. The term "advancement" is used herein in its conventional sense to mean a process in which an essentially linear, i.e., not substantially crosslinked, product of higher molecular weight is produced. In the present process, part of the etherifying methanol is eliminated.

DETAILED DISCLOSURE

Accordingly, this invention provides a process for the preparation of an advanced methylated, methylolated guanamine resin which comprises reaction of a methylated methylolated guanamine of the formula

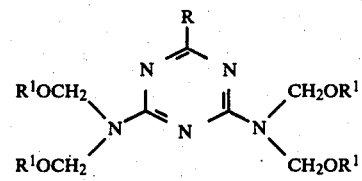

where

R represents an alkyl group of 1 to 16, and preferably 1 to 4, carbon atoms, a phenyl group, or a group of formula

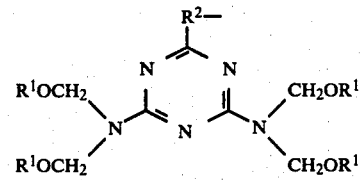

each $R^1$ represents a hydrogen atom or a methyl group with the proviso that, on average, at least 70% of the total number of groups $R^1$ on the methylated methylolated guanamine of formula I are methyl groups, and $R^2$ represents an alkylene group of from 2 to 16, and preferably 2 to 5, carbon atoms or a phenylene group, at a pH of from 2.5 to 7, with 0.1 to 1 mole, per gram equivalent of guanamine residue in the compound of formula I, of an advancement agent of general formula III $$R^4-NH-R^3-NH-R^5 \qquad III$$

where either $R^3$ represents a carbonyl group and $R^4$ and $R^5$ each represent a hydrogen atom or together represent an alkylene chain having from 2 to 4 carbon atoms which may be substituted by one or two hydroxyl groups, or $R^3$ represents a residue of formula

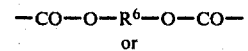

or

-continued

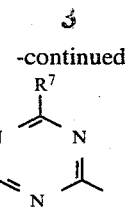
V where
R[6] represents an alkylene group of 2 to 20 carbon atoms or an arylene group of 6 to 12 carbon atoms, and
R[7] represents an alkyl group of 1 to 16 carbon atoms, a phenyl group, or an amino group ($NH_2$—),
and R[4] and R[5] each represent a hydrogen atom.

This advancement may be effected in the presence or absence of an acid catalyst, preferably at a pH of 4 to 7. Acids which may be used as the catalyst include formic acid, phosphoric acid, and aromatic sulphonic acids, especially toluene-p-sulphonic acid. The amount of the advancing agent of formula III, and the reaction conditions, may be varied according to the physical properties sought in the final product, more advancement agent and a longer reaction time generally leading to higher molecular weight materials, these having higher melting temperature ranges. Preferably, the reaction is effected with 0.2 to 0.7 mole of advancing agent of formula III per gram equivalent of guanamine residue in the compound of formula I, but as little as, e.g., 0.125 mole may be used successfully. Preferably, too, the mixture is heated in the presence or absence of an inert solvent at from 80° to 120° C. for from 2 to 6 hours. The product may be purified by removal of solvent if present and, if desired, by removal of the acid using conventional methods, including neutralisation. Often, however, it is not necessary to remove the acid, since it does not usually interfere with, and may indeed help, the later curing reactions. The product preferably melts within the range 50° to 130° C., especially within the range 60° to 90° C.

The etherified methylolated guanamines of formula I used as starting materials for the novel process are known materials, their preparation having been described in, for example, British Pat. No. 1,026,696 and West German Offenlegungsschrift No. 2 031 035.

They are normally prepared by reaction of a guanamine of general formula

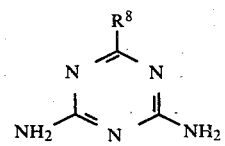
VI where R[8] represents an alkyl group of 1 to 16 carbon atoms, a phenyl group, or a group of formula

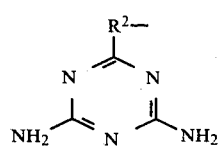
VII where R[2] is as hereinbefore defined, with at least 4 moles, and especially 4.5 to 7 moles, of formaldehyde per gram equivalent of guanamine residue in the guanamine of formula VI, under alkaline conditions, the methylolation being substantially complete after ¼ to 4 hours at 50° to 100° C. The mixture is then treated with at least 4 moles of methanol per gram equivalent of guanamine residue in the guanamine of formula VI and acidified. An excess of methanol is preferred, this excess serving as a solvent for the reaction. Acidification is effected using a strong acid, such as hydrochloric acid, which is preferably added in an amount sufficient to reduce the pH to within the range 1.5 to 4, and the reaction is carried out at any temperature from 20° C. to the boiling temperature of the mixture.

The reactant of formula I may, for example, be a methylated octamethyloladipoguanamine or a methylated octamethylolsuccinoguanamine, but preferably it is a methylated tetramethylolbenzoguanamine or a methylated tetramethylolacetoguanamine. As the advancement agent of formula III there may be used, for example, urea, melamine, ethylene dicarbamate, 1,4-butylene dicarbamate, and 1,2-dihydroxyethyleneurea (i.e., 4,5-dihydroxyimidazolidin-2-one) but preferably benzoguanamine, acetoguanamine, ethyleneurea (i.e., imidazolidin-2-one), or 1,3-propyleneurea (i.e., hexahydro-2H-pyrimidin-2-one).

The products of the present invention are suitable for use in a variety of coatings applications. They may, for example, be dissolved in an organic solvent or a mixture of organic solvents and blended with pigments, co-reactants, or other polymerisable materials as paints for application to wood or metals or as inks for application to paper or card. Alternatively, they may, if desired, be mixed with pigments, fillers, polymerisable materials, or co-reactants, ground to a fine powder, typically having a particle size within the range 0.015 to 500 μm, and used as powder coatings.

Suitable co-reactants contain two or more free alcoholic hydroxyl groups per average molecule and may be any of those used conventionally with guanamine resins, including alkyds, polyesters, hydroxyl-containing epoxide resins, and hydroxyl-containing acrylic resins. There also may be used (although in general they are less preferred, being less reactive towards the advanced methylated, methylolated resins of this invention) resins containing two or more free carboxylic acid groups per average molecule. Yet further suitable co-reactants comprise resins containing at least two amide groups (—$CONH_2$) per average molecule, such as copolymers of styrene and/or (meth)acrylic acid esters with minor proportions of (meth)acrylamide and (meth)acrylic acid as described in British Pat. No. 1,026,696.

The coatings may be applied by means conventional for liquid or powder coating compositions and, after drying if necessary, they may be cured at room temperature or by heating, usually within the range 35° to 300° C., especially from 100° to 200° C. or 225° C., to give a coating having a very good gloss, colour, hardness, and resistance to grease, staining, and detergents.

This invention therefore also provides a process for coating a surface which comprises applying to the surface an advanced methylated, methylolated guanamine resin prepared by the novel process, optionally with a compound containing at least two alcoholic hydroxy groups or at least two carboxylic acid groups or amide groups per average molecule, and causing the resin to form a hard, cross-linked coating, usually by heating.

This invention will be further illustrated in the following Examples, in which all parts are by weight (unless otherwise specified). Softening points are recorded as determined by means of a Kofler bench.

EXAMPLE 1

A. Preparation of a methylated, methylolated guanamine resin

Methanol (387.2 g), paraformaldehyde (444.6 g; 91% pure), benzoguanamine (841.5 g), and aqueous sodium hydroxide solution (54.0 ml; 20% w/w) were stirred and heated together for one hour at 70° C. A further quantity of paraformaldehyde (444.6 g) and of sodium hydroxide solution (54.0 ml; 20% w/w) were added, and heating was continued at 70° C. for one hour.

The mixture was cooled to 45°–50° C., and concentrated hydrochloric acid was added to bring the pH of the mixture to 8.6–8.8 (approximately 2.5 ml was required) Methanol (2475 g) was added, and the mixture was cooled to 36° C. Concentrated hydrochloric acid (67.5 ml) was added, and the mixture was stirred at 40° C. for 2 hours. The mixture was adjusted to pH 8.6–8.8 with 20% sodium hydroxide solution (approximately 117 ml) and the mixture was distilled under a water pump vacuum to remove aqueous methanol. When the temperature of the distillation residue reached 70° C., water (100 ml) was added and distillation was continued until the residue reached a temperature of 100°–110° C. This residue was then cooled to 90° C. and filtered to remove sodium chloride. The filtrate comprised a highly methylated tetramethylolbenzoguanamine resin (1550 g), a colourless clear liquid having a refractive index $n_D^{25}$ of 1.5700–1.5750 and a viscosity at 25° C. of 20–25 Pas. Its degree of methylation (i.e., the proportion of groups $R^1$ which are methyl groups) was 82.5%.

B. Advancement

This resin (104.54 g) and benzoguanamine (27.81 g, i.e., 0.51 mole per gram equivalent of guanamine residue in the resin) were mixed and stirred at 100° C. for 15 minutes. Toluene-p-sulphonic acid (0.4 ml of a 50% solution in methanol) was added and the mixture, which had a pH value of 5.0, was stirred at 100° C. for a further 2½ hours, all volatile materials being removed as they formed. At the end of this heating the residue had a softening point of 60° C.

The product was substantially of formula

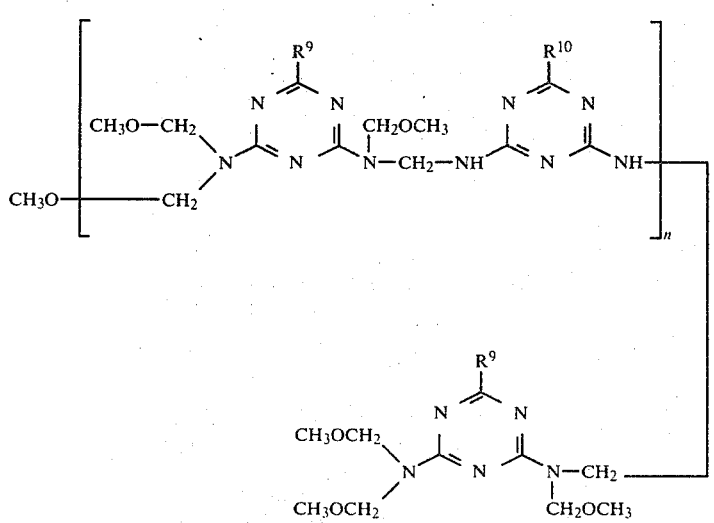

where n represents an integer of average value 0.8, as determined by vapour pressure osmometry, and $R^9$ and $R^{10}$ each represent a phenyl group.

EXAMPLE 2

A. Preparation of a methylated, methylolated guanamine resin

Acetoguanamine (600 g) and methanolic formaldehyde solution (939 g; 44% methanol, 46% formaldehyde, 10% water) were mixed with 57.6 ml of 20% aqueous sodium hydroxide solution and heated to 70° C. After 1 hour, paraformaldehyde (474.2 g; 91% formaldehyde) and 57.6 ml of 20% aqueous sodium hydroxide solution were added and the reaction was continued for a further hour. The solution was neutralised with hydrochloric acid, then methanol (2640 g) was added and the solution was cooled to 37° C. Hydrochloric acid (72 ml) was added, and the reaction was continued for a further 2 hours. After neutralising the mixture with 20% aqueous sodium hydroxide solution, excess of methanol and water were removed by distillation under reduced pressure. The product, a highly methylated tetramethylolacetoguanamine, which was filtered to remove sodium chloride, was a viscous liquid. Its degree of methylation was approximately 80%.

B. Advancement

To 689 parts of the above liquid was added 162.5 parts of acetoguanamine (i.e., 0.5 mole per gram equivalent of guanamine residue in the resin) and the mixture was heated to 120° C. After 15 minutes, 1.3 parts of toluene-p-sulphonic acid solution (50% in methanol) was added; reaction was continued at 120° C. until the product has a softening point of 75° C. The catalyst was neutralised with N-benzyldimethylamine and the product was allowed to solidify in a tray.

The product was substantially of formula VIII, in which $R^9$ and $R^{10}$ each represent a methyl group and n has a calculated average value of 1.0.

EXAMPLE 3

Example 2 was repeated but only 108 parts of acetoguanamine were used, instead of 162.5 parts, in the advancement reaction, i.e., 0.33 mole per gram equivalent of guanamine residue in the resin. Heating was continued for 10 hours at 120° C., and the product then had a softening point of 75° C. This product is of formula VIII, in which $R^9$ and $R^{10}$ each represent a methyl group and n has a calculated average value of 0.66.

EXAMPLE 4

Example 2 was repeated, the 162.5 parts of acetoguanamine employed in the advancement reaction being replaced by 243 parts of benzoguanamine, i.e., 0.5 mole per gram equivalent of guanamine residue in the resin. The reaction was continued until the product had a softening point of 60° C.

This product is of formula VIII, in which $R^9$ represents a methyl group, $R^{10}$ represents a phenyl group, and n has a calculated average value of 1.0.

EXAMPLE 5

The product of each of Examples 1, 2, and 4 was mixed with an equal weight of either a solid, hydroxyl-containing polyester resin (hydroxyl content 3.4 equiv./kg) prepared in a conventional manner from cyclohexanedimethanol, trimethylolpropane, neopentyl glycol, and dimethyl terephthalate, or a solid, hydroxyl-containing acrylic resin (hydroxyl content 1.91 equiv./kg) prepared in a conventional manner from 70% of methyl methacrylate and 30% of 2-hydroxyethyl methacrylate. For ease of application the mixtures were dissolved in xylene/n-butanol (1:1 by volume) to give a 50% solution. The solutions were applied by means of a wire-wound rod to glass or metal plates to give a coating 37.5 μm thickness. The coatings were cured for 15 minutes at 180° or 200° C. After being conditioned overnight at 65% relative humidity and 15.5° C. their hardness (Persoz) was measured, and they were tested for acetone rub resistance by rubbing 20 times with a swab of cotton wool soaked in acetone. The results obtained are recorded in Table I.

TABLE I

| Product of Example | Co-reactant | Cure Temp °C. | Hardness (Persoz) | Acetone Resistance |
|---|---|---|---|---|
| 1 | Polyester | 180 | 312 | no effect |
| 1 | Acrylic | 180 | 274 | no effect |
| 1 | Polyester | 200 | 289 | no effect |
| 1 | Acrylic | 200 | 286 | no effect |
| 2 | Polyester | 180 | 270 | slight softening |
| 2 | Acrylic | 180 | 256 | no effect |
| 2 | Polyester | 200 | 255 | slight softening |
| 2 | Acrylic | 200 | 263 | no effect |
| 4 | Polyester | 180 | 289 | softening |
| 4 | Acrylic | 180 | 291 | no effect |
| 4 | Polyester | 200 | 301 | slight softening |
| 4 | Acrylic | 200 | 256 | no effect |

EXAMPLE 6

A highly methylated tetramethylolbenzoguanamine resin was prepared as described in Part A of Example I. A 104.5 g portion of this resin was advanced by stirring with 14.9 g of 1,3-propyleneurea (i.e., 0.50 mole per gram equivalent of guanamine residue in the resin) at 100° C. for 15 minutes, adding toluene-p-sulphonic acid (0.4 ml of a 50% solution in methanol) to bring the pH to 5.2, and heating for a further 4 hours at 100° C., all volatile materials being removed as they formed. The product had a softening point of 65° C. The catalyst was neutralised with N-benzyldimethylamine.

EXAMPLE 7

The procedure of Example 6 was repeated, there being used 6.95 g of benzoguanamine (i.e., 0.125 mole per gram equivalent of guanamine residue in the resin) in place of the propyleneurea. The softening point of the product was 67° C.

EXAMPLE 8

Example 6 was repeated, there being used 14.2 g of ethyleneurea (90% pure, the balance being water), i.e., 0.50 mole per gram equivalent of the guanamine residue in the resin, in place of the 1,3-propyleneurea. The softening point of the product was 55° C.

EXAMPLE 9

Example 6 was repeated, there being used 13.5 g of melamine, i.e., 0.36 mole per gram equivalent of the guanamine residue in the resin in place of the 1,3-propyleneurea. The softening point of the product, which was opaque, was 74° C.

EXAMPLE 10

Example 6 was repeated, there being used in place of the 1,3-propyleneurea, 8.9 g of urea (i.e., 0.50 mole per gram equivalent of the guanamine residue in the resin). The softening point of the product was 60° C.

EXAMPLE 11

Example 6 was repeated, but in place of the 1,3-propyleneurea there was used 17.6 g of 1,2-dihydroxyethyleneurea (i.e., 0.50 mole per gram equivalent of the guanamine residue in the resin). The product had a softening point of 70° C.

EXAMPLE 12

Powder coating compositions were made from the products of Example 6 and 7. The components of each composition are listed in Table II.

TABLE II

| Component | Parts in Mixture | | | |
|---|---|---|---|---|
| | A | B | C | D |
| Product of Example 6 | 50 | — | 55 | — |
| Product of Example 7 | — | 50 | — | 55 |
| Polyester I* | 240 | 240 | — | — |
| Polyester II** | — | — | 200 | 200 |
| Polyacrylic resin (a commercially-available flow additive) | 5 | 5 | 5 | 5 |
| Benzoin (as flow additive) | 3 | 3 | 3 | 3 |
| Titanium dioxide | 200 | 200 | 175 | 175 |

*Polyester I denotes "Uralac P2115", an oil-free, hydroxyl group-containing branched polyester available from Synthetic Resins Ltd., Speke, Liverpool, England, which has the following properties: acid value less than 10 mg KOH/g; hydroxyl value 30–40 mg KOH/g; softening point (measured according to ASTM E28-67 without stirrer) 110°–120° C.
**Polyester II denotes BA 530, available from BIP Chemicals Ltd., Oldbury, Worley, Worcestershire, England, which has an acid value of approximately 7.5 mg KOH/g, a hydroxyl value of 90–110 mg KOH/g, and a softening point, measured according to BS 2782 Method 103A, of 90°–97° C.

Mixing was effected by dry blending, followed by hot-melt extrusion in a Buss Ko-Kneader using a barrel temperature of 95° C. and a screw temperature of 40° C. (Buss Ko-Kneader is a trademark). The extrudate was cooled to ambient temperature, crushed, and ground to a particle size below 75 μm, the bulk of the material having a particle size between 20 and 75 μm.

The gel times of these mixtures at 180° C. were:

| Mixture A | 9 minutes; |
| Mixture B | 7 minutes; |
| Mixture C | 8½ minutes; |
| Mixture D | 7 minutes. |

The mixtures were sprayed onto steel panels or onto chromate-treated aluminium panels using an electrostatic powder sprayer, and cured by heating for 20 minutes at 200° C., giving coatings 50 μm thick. These coatings were then tested as follows:

"EMK resistance" was determined by giving the panels 20 double rubs with a cotton wool swab soaked in ethyl methyl ketone.

"Flexibility" was determined by bending the panels around mandrels of decreasing diameter to find the smallest diameter around which the panels could be bent without cracking the coating.

"Gloss" was determined by the method of BS 3900 Part D2 (1967) using a 60° angle of incidence.

The results are given in Table III.

TABLE III

| Mixture | EMK resistance | Flexibility | Gloss | Appearance |
|---|---|---|---|---|
| A | Unaffected | 3 mm | 60% | hard, glossy, slight "orange peel" |
| B | Unaffected | 1.5 mm | 22% | hard, smooth, even matt |
| C | Unaffected | 12 mm | 40% | hard, glossy, slight "orange peel" |
| D | Unaffected | 12 mm | 20% | hard, smooth, even matt |

What is claimed is:

1. A process for the preparation of an advanced methylated, methylolguanamine resin which comprises reacting, at a pH of from 2.5 to 7, of
   (a) a methylated, methylolguanamine of the formula I $$\begin{array}{c} R \\ \text{triazine ring with } R^1OCH_2, R^1OCH_2 \text{ on one N and } CH_2OR^1, CH_2OR^1 \text{ on other N} \end{array} \quad I$$

where
R represents an alkyl group of 1 to 16 carbon atoms, a phenyl group, or a group of the formula II $$\begin{array}{c} R^2- \\ \text{triazine ring with } R^1OCH_2, R^1OCH_2 \text{ and } CH_2OR^1, CH_2OR^1 \end{array} \quad II$$

each $R^1$ represents a hydrogen atom or a methyl group with the proviso that, on average, at least 70% of the total number of groups $R^1$ on the methylated methylolguanamine of formula I are methyl groups, and
$R^2$ represents an alkylene group of from 2 to 16 carbon atoms or a phenylene group, with (b) an advancement agent of formula III $$R^4-NH-R^3-NH-R^5 \quad III$$

where
(1) $R^3$ represents a carbonyl group, and $R^4$ and $R^5$ each both represent a hydrogen atom or together represent an alkylene hydrocarbon chain having from 2 to 4 carbon atoms, or a group $$-\underset{OH}{CH}-\underset{OH}{CH}- \text{ or } -CH_2\underset{OH}{CH}CH_2-;$$

or
(2) $R^3$ represents a residue of formula $$-COO-R^6-OCO- \quad IV$$

or $$\begin{array}{c} R^7 \\ \text{triazine ring} \end{array} \quad V$$

where
$R^6$ represents an alkylene group of 2 to 20 carbon atoms or an arylene group of 6 to 12 carbon atoms,
$R^7$ represents an alkyl group of 1 to 16 carbon atoms, a phenyl group, or a group $-NH_2$,
and $R^4$ and $R^5$ both each represent a hydrogen atom; wherein 0.1 to 1 mole of component (b) is used per each gram equivalent of guanamine residue in component (a).

2. The process of claim 1, which is carried out at a pH in the range 4 to 7.

3. The process of claim 1, in which 0.2 to 0.7 mole of component (b) is used per gram equivalent of guanamine residue in component (a).

4. The process of claim 1, in which the reaction mixture is heated at a temperature in the range 80° to 120° C. for from 2 to 6 hours.

5. The process of claim 1, in which R in formula I represents an alkyl group of 1 to 4 carbon atoms.

6. The process of claim 1, in which the compound of formula I is a methylated tetramethylolbenzoguanamine, a methylated tetramethylolacetoguanamine, a methylated octamethyloladipoguanamine, or a methylated octamethylolsuccinoguanamine.

7. The process of claim 1, in which the advancement agent of formula III is urea, melamine, ethylene dicarbamate, 1,4-butylene dicarbamate, 1,2-dihydroxyethyleneurea, benzoguanamine, acetoguanamine, ethyleneurea, or 1,3-propyleneurea.

8. An advanced methylated, methylolated guanamine resin obtained by the process of claim 1 and melting within the range 60° to 130° C.

9. A process for coating a surface which comprises applying thereto an advanced resin obtained by the process of claim 1 and heating it to form a hard, crosslinked coating.

10. The process of claim 9, wherein the said advanced resin is heated in the presence of a co-reactant resin containing, per average molecule, at least two groups selected from alcoholic hydroxyl groups, carboxylic acid groups, and carboxylic amide groups.

* * * * *